United States Patent
Detty et al.

[11] 3,910,391
[45] Oct. 7, 1975

[54] PULLEY ASSEMBLY

[75] Inventors: Rodney H. Detty, Battle Creek; Wayne K. Leichliter, Marshall, both of Mich.

[73] Assignee: Eaton Corporation, Cleveland, Ohio

[22] Filed: Mar. 13, 1974

[21] Appl. No.: 450,665

[52] U.S. Cl.......... 192/58 B; 123/41.11; 123/41.46
[51] Int. Cl.$^2$...................... F16D 35/00; F01P 7/02
[58] Field of Search..... 192/58 B; 123/41.11, 41.12, 123/41.46

[56] References Cited
UNITED STATES PATENTS

| | | | |
|---|---|---|---|
| 3,002,595 | 10/1961 | Weir | 192/58 B |
| 3,065,595 | 11/1962 | Gary | 192/58 B |
| 3,272,188 | 9/1966 | Sabat | 192/58 B X |
| 3,430,743 | 3/1969 | Fujita et al. | 192/58 B |
| 3,505,982 | 4/1970 | Walter et al. | 123/41.12 |
| 3,559,785 | 2/1971 | Weir | 192/58 B |

*Primary Examiner*—Allan D. Herrmann
*Attorney, Agent, or Firm*—Teagno & Toddy

[57] ABSTRACT

An improved pulley assembly includes a rotatable body which defines a working chamber. A rotor is disposed within the working chamber and is fixedly connected with an output shaft. Shear surfaces on the pulley body and rotor cooperate with a fluid shear medium in the working chamber to transmit torque from the pulley body to the rotor upon rotation of the pulley body by a drive belt. Grooves are formed in the shear surfaces on the rotor to induce a flow of the fluid shear medium toward the center of a radially outer peripheral surface of the rotor. The output shaft extends through the rotor and is fixedly connected at one end to the impeller of a water pump. The other end of the output shaft is fixedly connected with a fan.

10 Claims, 6 Drawing Figures

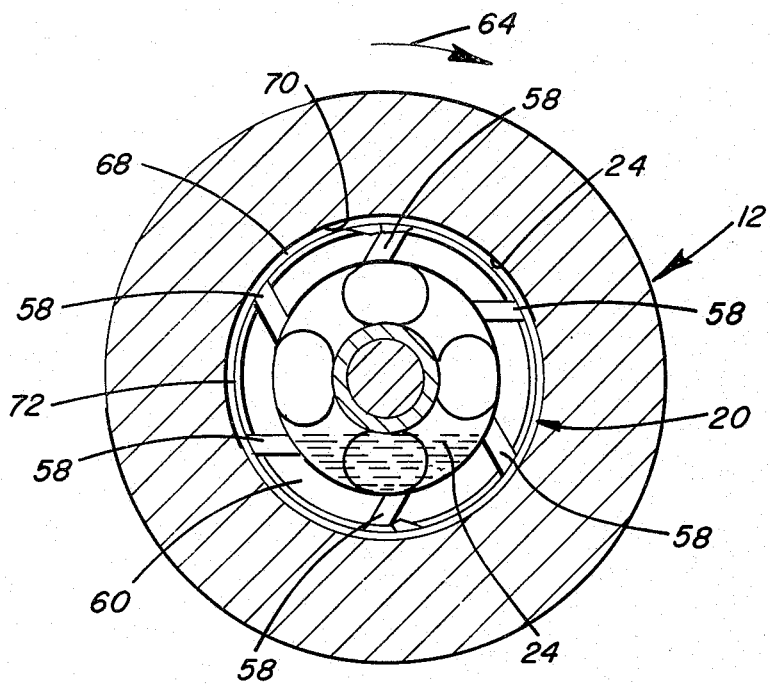
FIG. 3
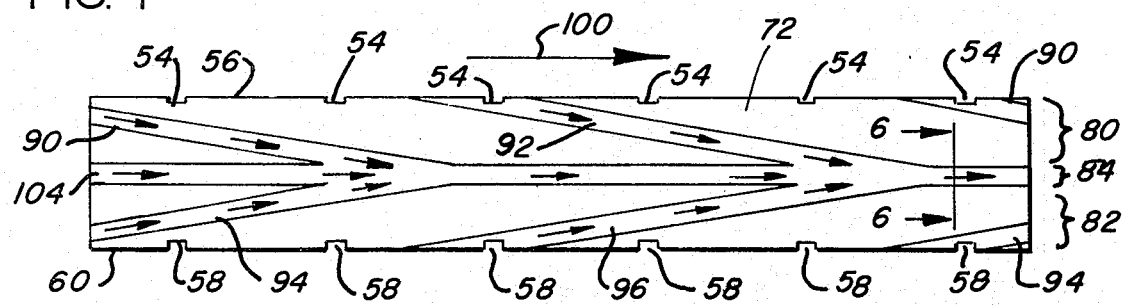
FIG. 4
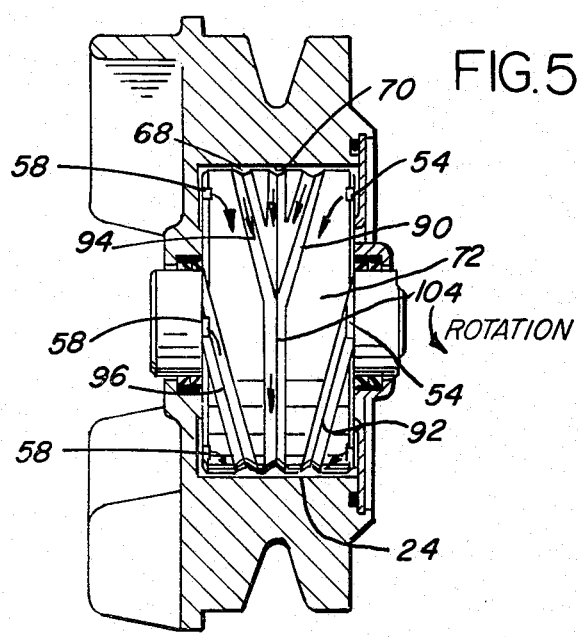
FIG. 5
FIG. 6

PULLEY ASSEMBLY

BACKGROUND OF THE INVENTION

It is a common practice to cool the engine of a vehicle with water circulated by a pump and air which is induced to flow around the engine by fan blades. As the speed of operation of the engine increases, the efficiencies of these cooling devices decreases at a rate which is much less than the rate of increase in the speed of the engine. However, the power consumed by these cooling devices tends to increase approximately as a cubic function of engine speed. Therefore, the water pump and fan have been driven by a pulley assembly which slips at an increased rate as engine speed increases. One known pulley assembly which is designed for such a purpose is disclosed in U.S. Pat. No. 3,430,743.

Although known pulley assemblies have been more or less satisfactory in operation, it is believed that they do not provide an optimum combination of desirable operating characteristics and low cost construction. In addition, the known pulleys have been somewhat difficult to install in association with a water pump and fan for cooling an engine.

SUMMARY OF THE PRESENT INVENTION

The present invention relates to a pulley assembly having a rotatable body which drives a rotor disposed in a working chamber within the body. When the pulley body is rotated, it drives the rotor through a fluid shear medium within the working chamber. A plurality of grooves are formed in the rotor to promote a flow of the fluid shear medium toward the center of the outer surface of the rotor.

The pulley assembly is advantageously utilized to drive a water pump and fan to cool an engine. When the pulley assembly is so utilized, a single output shaft is connected with the rotor. The impeller of the water pump is connected with one end of the output shaft and a fan is connected with the other end of the output shaft. Due to the relatively simple construction of the pulley assembly and the use of a single output shaft to drive both the water pump and fan, the pulley assembly is both economical to fabricate and readily installed in association with an engine.

BRIEF DESCRIPTION OF THE DRAWINGS

The foregoing and other objects and features of the present invention will become more apparent upon a consideration of the following description taken in connection with the accompanying drawings wherein:

FIG. 3 is a sectional view, taken generally along the line 3—3 of FIG. 1, further illustrating the construction of the rotor;

FIG. 4 is a developed view of a groove pattern on a radially outer circular shear surface of the rotor;

FIG. 5 is a sectional view, generally similar to FIG. 1, illustrating the relationship of the grooves in the shear surface of the rotor to the body of the pulley assembly; and FIG. 6 is a sectional view, taken along the line 6—6 of FIG. 4 illustrating the cross sectional configuration of a a groove in the rotor.

DESCRIPTION OF ONE SPECIFIC PREFERRED EMBODIMENT OF THE INVENTION

Figure 1:
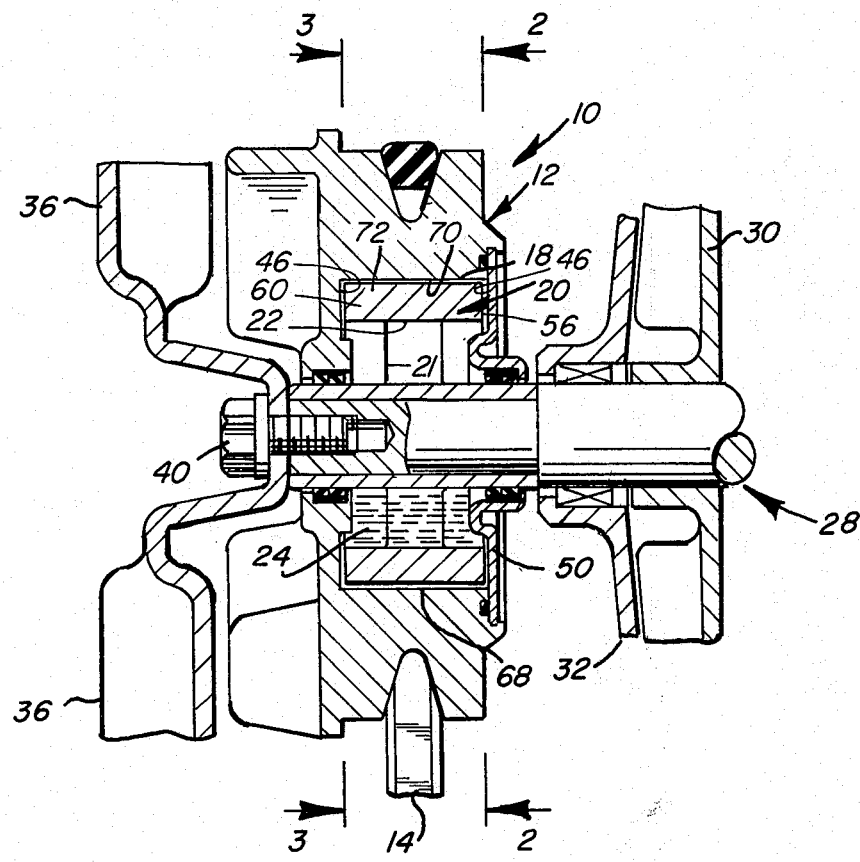
FIG. 1 is a fragmentary sectional view illustrating a pulley assembly constructed in accordance with the present invention in association with a water pump impeller and a fan.

A pulley assembly 10 constructed in accordance with the present invention includes a body 12 which is driven by a flexible belt 14. The body 12 partially defines a generally cylindrical working chamber 18 in which a rotor 20 having a number of spaced ribs 21 and bores 22 is disposed. Upon rotation of the pulley body 12 by the belt 14, a fluid shear medium 24 transmits torque from the body to the rotor 20.

The rotor 20 is fixedly connected with a single output shaft 28. A rearward end portion of the output shaft 28 is fixedly connected with the impeller 30 of a water pump 32. Upon rotation of the output shaft 28 and impeller 30, the water pump 32 circulates water to cool an associated engine (not shown) in a known manner.

A plurality of fan blades 36 are fixedly connected with a forward end portion of the output shaft 28 by a suitable connection, such as a bolt 40. During operation of the engine, a pulley connected with the crank shaft of the engine (not shown) drives the belt 14 to rotate the pulley body 12 and rotor 20. Rotation of the rotor 20 rotates the output shaft 28 to drive both the impeller 30 and fan blades 36.

Since the pulley body 12 drives the rotor 20 through only the viscous fluid shear medium 24, slippage can occur between the rotor 20 and pulley body 12. The extent of slippage increases as the operating speed of the engine increases to thereby decrease the load applied to the engine by the water pump 32 and fan blades 36 during high speed operation of the engine.

The rotor 20 is provided with shear surfaces 72, 56, and 60. Shear surfaces 70 and 46 are provided respectively on the pulley body 12, and the pulley body 12 and a circular end plate 50 connected with the pulley body. During rotation of the pulley body 12 by the belt 14, the rotor shear surfaces are spaced apart from the pulley body shear surfaces by a relatively small distance to form a shear space in which the fluid shear medium 24 is disposed. The fluid shear medium, which may be a silicone liquid, transmits viscous shear forces from the pulley body 12 to the rotor 20 to rotate the rotor upon rotation of the pulley 12.

During high speed operation of the engine, the viscous shear fluid 24 is incapable of transmitting all of the drive forces from the body 12 to the rotor 20 and relative movement or rotation occurs between the body and the rotor. Thus as the body 12 is rotated in a clockwise direction as viewed from the front or in FIG. 3, slippage occurs between the rotor 20 and the body 12. This slippage or relative rotation occurs because the forces required to drive the water pump impeller 30 and fan blades 36 at high speeds are greater than the viscous shear drag forces applied to the rotor shear surfaces. Therefore, the rotor 20 is rotated in a clockwise direction at a slower speed than the body 20. At this time, viscous drag forces are applied by the shear fluid medium 24 to the rotor shear surfaces.

Figure 2:
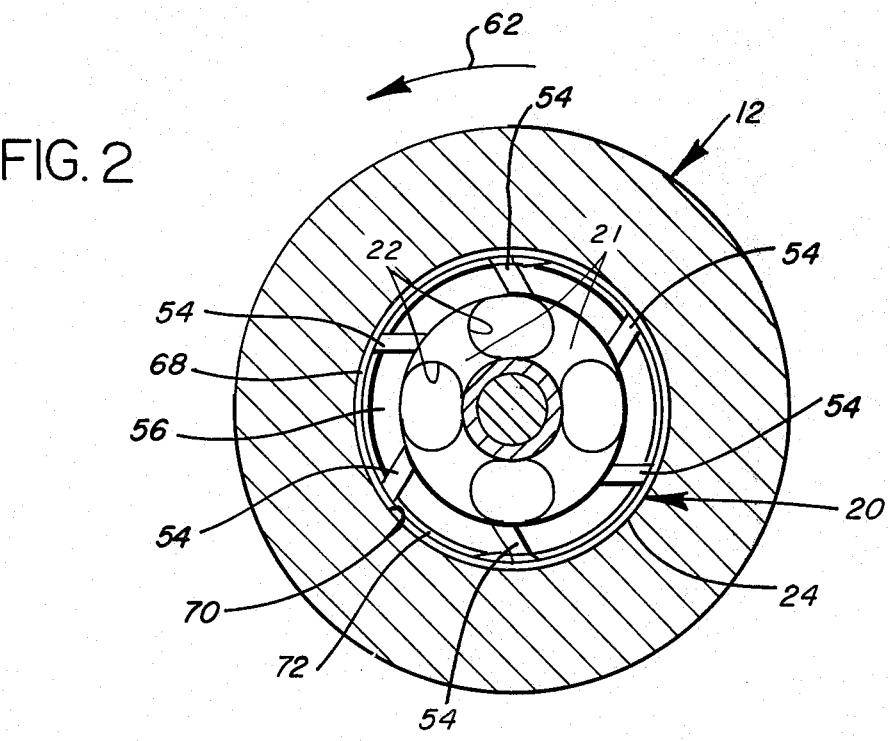
FIG. 2 is a sectional view, taken generally along the line 2—2 of FIG. 1, illustrating the relationship between a rotor and body of the pulley assembly.

As the pulley body 12 and rotor 20 are rotated, a plurality of grooves 54 (FIG. 2) formed in side shear surface 56 of the rotor 20 are effective to induce a radially outward flow of the liquid shear medium 24. Grooves 58 formed in side shear surface 60 of the rotor 20 (FIG.

3) are also effective to induce a radially outward flow of the liquid shear medium as the rotor 20 is rotated. The grooves 54 and 58 are formed in such a manner that they extend radially outwardly and forwardly in the direction of rotation of the rotor 20 and pulley body 12, the direction of rotation being indicated by the arrows 62 and 64 in FIGS. 2 and 3 respectively. The pumping action of the grooves 54 and 58 induces fluid to flow into a generally cylindrical shear space 68 formed between cylindrical shear surface 70 which is smooth, and cylindrical shear surface 72 which is grooved.

The generally cylindrical shear surface 72 on the rotor 20 is provided with a plurality of grooves 76 (FIGS. 4 and 5) which induce an inward flow of fluid from opposite axially outer side portions 80 and 82 (FIG. 4) of the surface 72 toward a central portion 84 of the surface. To provide for this inward flow of fluid from the opposite side portions 80 and 82 of the axially extending surface 72, grooves 90 and 92 in the side portion 80 extend inwardly from the radially extending side surface 56. Similarly, grooves 94 and 96 in the side portion 82 extend inwardly from the radially extending side surface 60. Each of the grooves 90, 92, 94 and 96 has a longitudinal central axis which extends at an acute angle to the associated side surface 56 or 60 and to a longitudinal central axis of the surface 72. The grooves 90 through 96 extend forwardly, that is in the direction of rotation of the rotor 20 and pulley body 12. The direction of rotation of the rotor 20 and pulley body 12 is indicated by the arrow 100 in FIG. 4.

When the pulley body 12 is rotated at a higher speed than the rotor 20, the shear surface 70 on the pulley body induces an inward and forward flow of fluid along the grooves 90–96 in the manner indicated by the arrows in FIG. 4. The longitudinal axes of the grooves 90 and 94 intersect at the central axis of the surface 72. Similarly, the longitudinal axes of the grooves 92 and 96 also intersect at the central axis of the surface 72. The central axis of the surface 72 is coincident with the longitudinally extending central axis of a main or central groove 104. Due to the interaction between the shear surface 70 on the pulley body 12 and the viscous shear medium 24 when the pulley body 12 is being rotated in a clockwise direction relative to the rotor 20, a left to right (as viewed in FIG. 4) flow of fluid is induced in the central groove 104 in the manner indicated by the arrows in FIG. 4.

During rotation of the rotor 20, fluid flows radially outwardly from the side grooves 54 and 58 in the side surfaces 56 and 60 into the grooves 90 through 96 in the surface 72 in the manner indicated by the arrows in FIG. 5. To promote this flow, each of the grooves 90 through 96 terminates at one of the side grooves 54 or 58. In addition, other side grooves 54 and 58 terminate between the ends of the grooves 90 through 96. These intermediate side grooves induce a flow of fluid across the generally flat or cylindrical surface 72. Due to the flow currents set up in the grooves 90 through 96, this flow of fluid from the intermediate side grooves 54 and 58 will be toward the central portion 84 of the surface 72 (see FIG. 5).

Each of the grooves in the rotor 20 has a cross sectional configuration generally similar to the cross sectional configuration of the grooves 104 (see FIG. 6). The groove 104 has a generally arcuate bottom portion 110 which is connected with a flat cylindrical portion of the surface 72 by sloping sides 112 and 114.

In view of the foregoing description, it can be seen that the pulley assembly 10 includes a rotor 20 which is driven by a pulley body 12 to rotate a single output shaft 28. The single output shaft 28 is connected at one end to the water pump impeller 30 and at the other end with the fan blades 36. Therefore upon rotation of the pulley body 12 and rotor 20, the pump impeller 30 and fan blades 36 are rotated to cool the associated engine.

During high speed operation of the engine, the fluid shear medium 24 is ineffective to transmit sufficient torque to overcome the load applied to the rotor 20 by the impeller 30 and fan blades 36. Therefore, the pulley body 12 will rotate forwardly relative to the rotor 20. The slippage between the pulley body 12 and rotor 20 functions to reduce the load applied to the engine by the impeller 30 and the fan blades 36 during high speed operation of the engine.

Grooves are formed in shear surfaces 56 and 60 on the rotor 20 to induce a radially outward flow of fluid from a central portion of the rotor 20 to a radially outer surface 72 of the rotor. Grooves are formed in the radially outer portion of the surface 72 to induce the flow of fluid inwardly toward the central portion of the surface 72. Thus, the grooves 90, 92, 94 and 96 induce a flow of shear fluid from the axially outer side portions 80 and 82 of the surface 72 toward the central portion 84 of the surface 72. A circular central grooves 104 is formed in the central portion 84 of the surface 72 to receive fluid from the transversely inwardly and forwardly extending side grooves 90, 92, 94 and 96.

Having described one specific preferred embodiment of the invention, the following is claimed:

1. An assembly comprising a rotatable pulley body which at least partially defines a central working chamber for holding a fluid shear medium, said pulley body including outer surface means defining a circular groove for receiving a flexible drive member which is movable to rotate said pulley body, a rotor disposed in said working chamber and adopted to be connected with an output shaft for rotation about an axis, first shear surface means disposed on said pulley body, second shear surface means disposed on said rotor and cooperating with said first shear surface means to define a shear space between said rotor and pulley body for receiving the fluid shear medium to thereby transmit torque between said pulley body and rotor upon rotation of said pulley body by the flexible drive member, said second shear surface means including an annular outer generally cylindrical peripheral surface on said rotor, said annular outer peripheral surface including a circular central portion and a pair of circular axially outer side portions disposed on opposite sides of said central portion, and groove means disposed in said side portions for inducing a flow of the fluid shear medium from said side portions of said outer peripheral surface toward the central portion of said outer peripheral surface.

2. An assembly as set forth in claim 1 wherein said second shear surface means further includes a pair of annular side surfaces disposed on opposite sides of said rotor and extending transversely to said outer peripheral surface of said rotor, and side groove means disposed in said annular side surfaces for inducing a radially outward flow of the fluid shear medium toward said outer peripheral surface of said rotor upon rotation of said pulley body by said flexible drive member.

3. An assembly as set forth in claim 1 wherein said second shear surface means includes first and second annular side surfaces disposed on opposite sides of said rotor and extending transversely to said annular outer peripheral surface, and said groove means includes a first groove disposed in one of said side portions of said outer peripheral surface and extending inwardly toward said circular central portion at an acute angle to said first side surface, and a second groove disposed on the other of said side portions of said outer peripheral surface and extending inwardly toward said circular central portion at an acute angle to said second side surface.

4. An assembly as set forth in claim 3 wherein said groove means further includes a circular central groove disposed in said central portion of said outer peripheral surface, said first and second grooves intersecting said central groove at an acute angle.

5. A fluid coupling comprising: a rotatable input coupling member; a rotatable output coupling member disposed adjacent to said input coupling member; means for supporting said coupling members for rotation relative to each other about an axis; generally concentric spaced apart generally cylindrical surfaces on said input and output coupling members defining an annular fluid shear space therebetween and cooperating with a fluid shear medium during relative rotation between said coupling members to provide a fluid drive between said coupling members; and grooves disposed on one of said generally cylindrical surfaces, said grooves including a first set of grooves extending at an acute angle from one edge of said one generally cylindrical surface toward the center of said one surface and a second set of grooves extending at an acute angle from the other edge of said one generally cylindrical surface toward the center of said one surface, whereby during rotation said fluid shear medium is moved along said grooves.

6. A fluid coupling as set forth in claim 5 further comprising another groove encircling said one generally cylindrical surface intermediate to said edges of said one surface and intersecting said grooves of said first and second sets of grooves.

7. A fluid coupling as set forth in claim 6 wherein said grooves of said first and second sets of grooves extend from the edges of said one generally cylindrical surface toward the center of said one surface in a general direction that corresponds to the direction of rotation of said one surface, whereby said fluid shear medium will be directed from said edges of said one surface toward the center of said one surface during relative rotation of said coupling members.

8. A fluid coupling as set forth in claim 7 wherein said output coupling member further includes a pair of spaced side surfaces extending generally radially from said axis and terminating at the edges of said generally cylindrical surface of said output coupling member, said side surfaces including generally radially extending grooves terminating radially outwardly from said axis at a location adjacent the edges of said one generally cylindrical surface that includes said first and second sets of grooves.

9. A fluid coupling as set forth in claim 7 wherein all of said grooves are located on the generally cylindrical surface of said output coupling member.

10. A fluid coupling as set forth in claim 9 wherein said output coupling member further includes a pair of spaced side surfaces extending generally radially outward away from said axis and terminating at the edges of said generally cylindrical surface of said output coupling member, said side surfaces including grooves extending in a general radial direction to induce a radially outward flow of said fluid shear medium toward said generally cylindrical surface of said output coupling member upon rotation of said output coupling member, certain of said grooves in said side surfaces terminate at one end of certain of said grooves in said generally cylindrical surface of said output coupling member.

* * * * *